June 11, 1929.  S. VERNET  1,717,076
WINDSHIELD WIPER ATTACHMENT
Filed Jan. 26, 1925  2 Sheets-Sheet 2
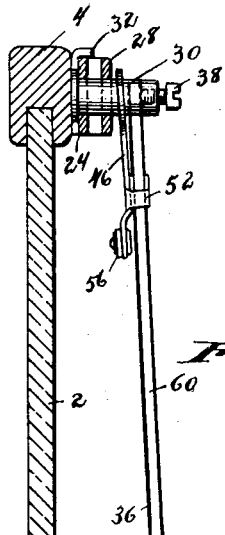
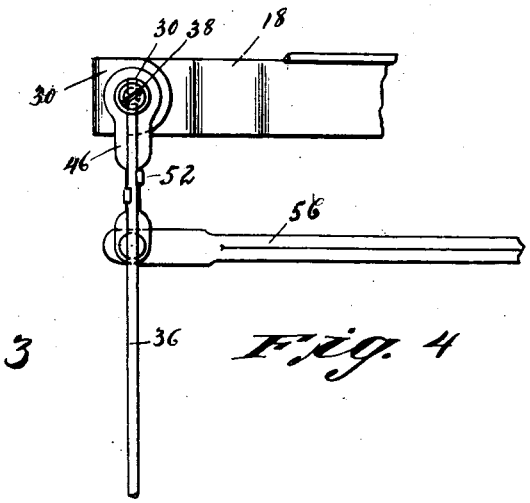
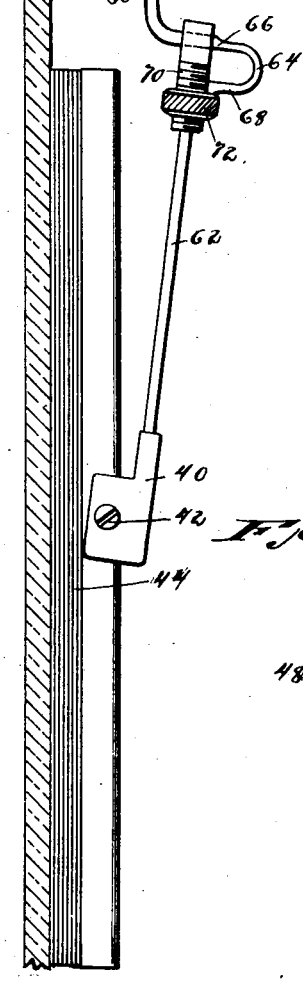
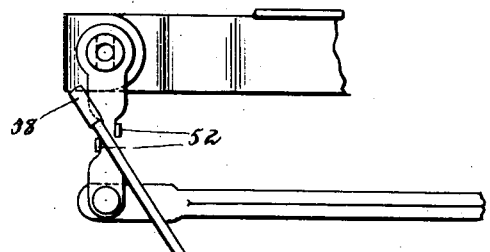
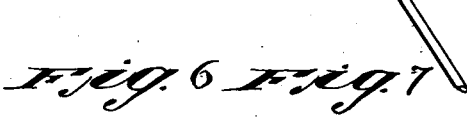
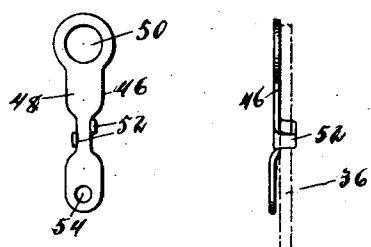
INVENTOR.
SERGIUS VERNET
BY Hammond &tell
ATTORNEYS.

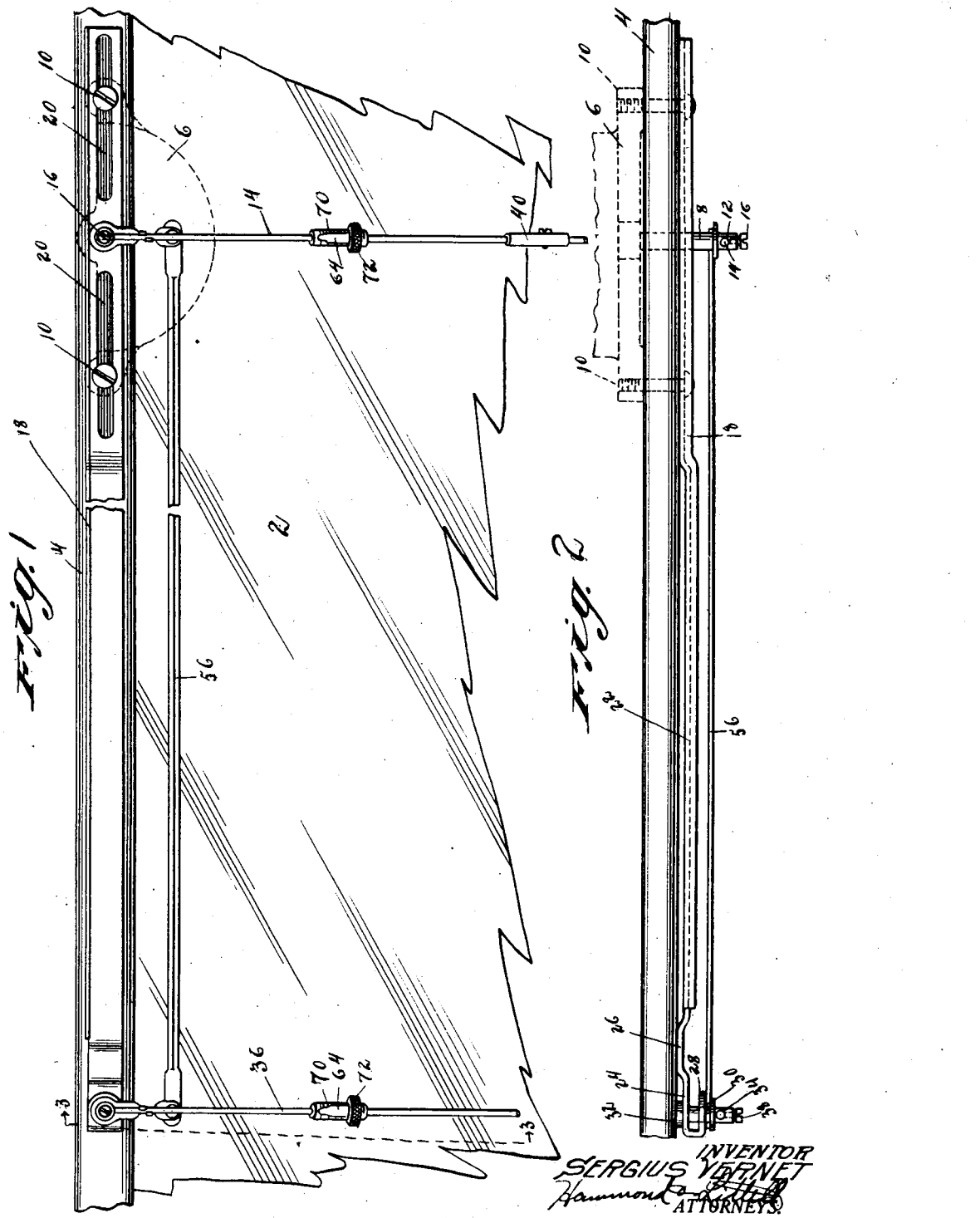

Patented June 11, 1929.

1,717,076

UNITED STATES PATENT OFFICE.

SERGIUS VERNET, OF BROOKLYN, NEW YORK.

WINDSHIELD-WIPER ATTACHMENT.

Application filed January 26, 1925. Serial No. 4,634.

This invention relates to windshield wipers or cleaners and has particular reference to wipers of the type commonly applied to the windshield of an automobile for wiping and cleaning the external surface of the windshield during rainy and snowy weather.

A general object of the invention is to provide a novel and effective windshield wiper by means of which a larger area of the windshield is cleaned than with wipers of the type heretofore in use.

A further object of the invention resides in the provision of a pair of wiping elements, spaced from each other, supported from the same point on the automobile, and connected together so as to oscillate as a unit.

A further object of this invention is to provide a plurality of spaced wiping elements which are pivotally supported upon the windshield frame for oscillatory movement across the external face of the windshield whereby both the driver and passengers are given a clear and unobstructed view.

Another important object of the invention resides in the provision of simple and effective means for mounting the wipers upon the windshield whereby a second wiper may be easily and quickly added to and driven from the single wiper now ordinarily used upon automobiles, without substantial changes in the mounting or construction of the usual wiper.

These and other features of the invention will appear more fully from the following detailed description when read in connection with the accompanying drawings, and will be pointed out in the appended claims.

In the drawings:

Figure 1 is a front elevation of my invention applied to the windshield of an automobile;

Figure 2 is a plan view thereof;

Figure 3 is an enlarged cross section along line 3—3 of Figure 1;

Figure 4 is a detail front view of the mounting for the auxiliary wiper arm and the connecting rod;

Figure 5 illustrates one manner in which a modified type of wiper arm is assembled in the holder;

Figure 6 is a front view of the holding devices for the wiper arms; and

Figure 7 is a side elevation thereof, the wiper arm being shown in dotted lines.

As will be understood from the description below, a particularly advantageous feature of my invention is that it may easily be applied to automobiles which are so constructed that it is impossible to drill extra holes in the top of the windshield frame.

Referring more particularly to the drawings, 2 designates the usual transparent windshield, with which all motor vehicles are ordinarily provided, the windshield being mounted in a suitable frame such as 4.

Mounted upon the inner face of the top rail of the windshield frame, and adjacent to one end thereof, is a casing 6 which encloses an operating or driving mechanism capable of giving an oscillatory movement to a rock shaft 8 which projects through an opening provided in the windshield frame and terminates adjacent the external surface of the windshield. The operating mechanism in casing 6 is secured to the frame of the windshield in any suitable manner, such as by screws 10. The operating mechanism may be of any well known form and construction, deriving its power from any convenient source, and since it does not form an essential part of the present invention will not be further described in detail herein.

The outer end of the rock shaft 8 is provided with a transverse bore 12 for the reception of the upper end of a wiper arm 14, the arm being retained within said bore by a lock screw 16 provided in the end of the rock shaft.

To permit the use of a second wiper arm with this somewhat conventional assembly, a supporting bar 18 is mounted upon the front of the windshield frame 4, said bar being provided adjacent one end thereof with elongated slots 20 adapted to receive the screws 10, by means of which the bar is secured in position. The elongated formation of the slots 20 permits the use of a standard sized bar in connection with various shapes and sizes of wiper operating devices without requiring other securing means in addition to the screws employed in retaining the operating mechanism in position. The supporting bar 18 is preferably of metal and is shaped to provide offset portions 22 and 24 connected by a portion 26 which is arranged substantially in the plane of the end of the bar secured to the frame. This formation of the bar serves to produce a spring effect, through which the free end of the bar is firmly held against the windshield frame when the bar has been attached in position, by means of the screws 10. The free end of the bar is folded over to provide a lug 28 spaced from and parallel with the offset portion 24 of the bar, the lug 28 and the portion 24 being perforated to form a suitable bearing for a stud or pivot member 30. The stud 30 is formed upon its inner end with an enlarged head 32, which is clamped between the end of the bar 18 and the frame 4 to effectively prevent longitudinal displacement of the stud in a manner readily understood.

The outer end of the stud 30 is provided with a transverse bore 34, in which is mounted the upper end of a wiper arm 36, the said arm being locked within the bore by a screw 38 entering from the end of the stud, the mounting of the wiper arm 36 being identical with that of the arm 14 previously described.

The wiping arms 14 and 36 are preferably identical both as to construction and operation. Each arm is formed of a resilient material, and is provided with a rearwardly inclined lower portion, so that the lower end will be in proximity to the windshield. The lower ends of the wiper arms are provided with holders 40, in which are pivotally mounted at 42 wiping or scraping elements 44, which are made of rubber, felt, or other yieldable material.

As previously set forth, the wiper arm 14 and the wiper element secured thereto are oscillated back and forth across the front of the windshield by means of the rock shaft 8 and the operating mechanism in casing 6. This invention contemplates the provision of suitable connections or motion transmitting means between the arm 14 and the arm 36 whereby the latter is operated from, and in synchronism with, the former. To this end, duplicate holding devices 46 are provided for each arm, a preferred embodiment of such devices being shown in detail in Figures 6 and 7. Each holder 46 consists of an elongated metallic link 48 which is provided in one end with an opening 50 adapted to loosely receive one of the studs 8 or 30 to which the wiper arms are connected. Intermediate its length, the link 48 is formed with upstanding lugs or fingers 52, which are staggered with respect to each other. These lugs 52 are adapted to clamp a wiper arm therebetween to firmly connect each arm to its corresponding holding device.

The lower end of the link 48 is rearwardly offset and provided with an opening 54 therein. The holding devices 46 are rigidly connected together by a tie rod 56 which is attached to the plates by a suitable rivet or screw passing through the ends of the rod and the openings 54 in the lower ends of the holders.

In assembling the apparatus, the holding devices or links 46, either before or after the attachment of the tie rod, are placed over the stud 30 and the rock shaft 8. The wiper arms are then inserted in the transverse bore of the stud and shaft and secured by means of the end retaining screw. The wiper arms are then shoved between the lugs 52 on the holding devices, the lugs being thereupon pinched around the arms by any suitable means such as pliers.

The wiper carrying arms are sometimes provided at the upper end with an enlarged head such as indicated at 58 in Figure 5. With such a construction, the wiper arm is inserted diagonally between the lugs 52 with the enlarged head between the lugs and the supporting stud, the arm is then swung into vertical position to bring the head of the arm beneath the transverse bore in the stud, after which the head may be shoved into the bore by lifting the arm vertically.

Provision is made for adjusting the wiper arms so that the wiper element can be made to exert any desired pressure against the windshield glass. To this end, each wiper arm is formed in two integral sections, an upper section 60 and a lower section 62, the latter being inclined toward the face of the windshield to bring the lower end of the arm in proximity to the surface of the windshield. The lower end of the upper section 60 is formed with a laterally off-set bend or loop 64 having spaced parallel arms 66 and 68, the latter terminating approximately below the middle portion of the upper section. The lower section 62 is connected to one end of a threaded bolt 70, the opposite end of which is provided with a transverse bore adapted to receive the upper arm 66 of the loop 64 therein. An adjusting nut 72 is threaded upon bolt 70, the upper surface of said nut serving as an abutment against which the free end of the lower arm 68 of the loop seats. From this construction, it will be clear that the spring action of the loop 64 will urge the lower section of the arm toward the windshield at all times, the amount of pressure of the wipers against the glass being regulated by the position of the adjustable nut 72.

By the provision of a plurality of spaced wipers, a greater portion of the windshield surface is cleaned than could possibly be accomplished with a single wiper element such as ordinarily employed. Not only is the driver of the automobile afforded a clear and unobstructed view ahead of the car, but the passengers upon the front seat are afforded a similar vision through the action of the supplemental or additional wiper.

A windshield cleaning device constructed according to the present invention is simple in construction, durable and efficient in use, and may be quickly added to cars already equipped with oscillating windshield wipers, to give the desired double vision without drilling additional holes in the windshield frame, and at a comparatively small expense.

Various modifications and changes can be made from the embodiment of my invention described and illustrated without departing from the spirit of the invention or the scope of the appended claims.

I claim:

1. A wiper attachment for windsheilds provided with one oscillating windshield wiper attached to said windshield by spaced attaching means, comprising supporting means connected to the windshield frame by the said spaced attaching means of the said first wiper, a stud shaft supported by said supporting means on the front face of the windshield frame and spaced from the rock shaft of said first wiper, a wiper arm supported by said stud shaft, and means for connecting said wiper arm with the wiper arm of said first wiper to cause the same to be oscillated thereby.

2. A windshield cleaner comprising, a rock shaft mounted in the frame of said windshield and projecting beyond the front face thereof, a stud supported from the front face of said frame and spaced from said rock shaft, wiper arms depending from the outer end of said rock shaft and stud, wiping elements secured to the lower ends of said arms in position to engage the external face of said windshield, and means for connecting said wiper arms together, whereby said arms will move synchronously upon actuation of said rock shaft, the said connecting means comprising holding devices loosely mounted on said rock shaft and stud, the said holding devices being arranged upon said rock shaft and stud rearwardly of said wiper arms, lugs upon the face of each holding device intermediate its ends and adjacent a wiper arm, the lugs on each holding device being adapted to receive and clamp a wiper arm therebetween, and a rod connecting the free ends of said holding devices together.

3. A windshield cleaner having in combination, a rock shaft mounted on the frame of the windshield and projecting beyond the front face of the windshield adjacent one end thereof, a supporting bar secured to the front of the windshield frame and extending parallel with the top of the frame, bearings in the end of said bar remote from the rock shaft, a stud loosely mounted in said bearings and projecting beyond the front face of said bar, means for retaining said stud in said bearings, the said rock shaft and stud being provided with a transverse bore adjacent the outer end thereof, a pair of wiper arms the upper ends of which are mounted in the bores in the rock shaft and stud respectively, means for retaining the wiper arms within said bores, wiping elements secured to the lower ends of said arms in position to engage the external face of said windshield, and means for rigidly connecting said wiper arms together whereby the wiping elements are moved synchronously upon the actuation of said rock shaft, the said connecting means comprising holding devices loosely mounted upon said rock shaft and stud respectively, the said holding devices being arranged between the wiper arms and the windshield, means on each of said holding devices for connecting one of said wiper arms thereto and a tie bar for rigidly connecting said holding devices together.

4. A windshield cleaner comprising, a supporting bar arranged upon the exterior of the windshield frame, the said bar being provided adjacent one end thereof with elongated longitudinally extending slots, means extending through said slots for securing the bar in position, a rock shaft extending through said frame and bar between said slots, means for oscillating said rock shaft, a stud loosely mounted in the opposite end of said supporting bar, the said stud and rock shaft being provided with a transverse bore in the outer end thereof, wiper arms mounted in said bores in the stud and rock shaft and depending therefrom, means for retaining the wiper arms in said bores, wiping elements secured to the lower ends of said wiper arms adapted to engage the external face of said windshield, holding devices loosely mounted upon and depending from said stud and rock shaft, the said holding devices being arranged between the wiper arms and the supporting bar, staggered lugs upon the face of each of said holding devices intermediate its ends and adjadent to the wiper arms adapted to grip a wiper arm therebetween to secure each holding device to a wiper arm, and a tie rod for connecting the free ends of said holding devices together, whereby said wiper arms are oscillated in unison across the face of the windshield by said rock shaft.

5. A windshield cleaner comprising, a rock shaft adapted to extend through the frame of a windshield and adjacent one edge thereof, means upon the rear of said windshield for oscillating said shaft, a depending wiper arm having its upper end connected to the outer end of said shaft adjacent to the external surface of said windshield, a supporting bar adapted to extend a substantial distance across the front face of the top of the windshield frame, means for securing one end of said bar to said frame in the vicinity of said rock shaft, the said bar being offset intermediate its ends to produce a spring effect whereby the free end is held firmly against said frame, a lug upon the free end of said bar spaced from and parallel with the body portion of said bar, the said lug and bar being provided with aligned bearing openings, a stud loosely mounted within said bearings and having an end extending beyond said bearings, means for retaining said stud in said bearings, a second wiper arm secured to and depending from the extended end of said stud, wiping elements upon the lower ends of said wiper arms arranged to contact with the external surface of said windshield, depending holding devices loosely mounted upon said stud and rock shaft, means for rigidly connecting said holding devices to said wiper arms, and means for rigidly connecting said holding devices together, whereby the oscillatory movement of the wiper arm connected to the rock shaft will be reproduced synchronously in the other wiper arm.

In testimony whereof I have affixed my signature to this specification.

SERGIUS VERNET.